United States Patent [19]

Kawabata et al.

[11] Patent Number: 5,240,792
[45] Date of Patent: Aug. 31, 1993

[54] BATTERY HOLDER FOR ELECTRONIC APPARATUS

[75] Inventors: Yoshimasa Kawabata; Takahiro Hayashi, both of Yokohama, Japan

[73] Assignee: Matsushita Electric Industrial Co., Ltd., Osaka, Japan

[21] Appl. No.: 878,455

[22] Filed: May 5, 1992

[30] Foreign Application Priority Data

May 13, 1991 [JP] Japan .................. 3-107241

[51] Int. Cl.$^5$ .............................. H01M 2/10
[52] U.S. Cl. .................... 429/197; 429/100
[58] Field of Search .............. 429/1, 9, 123, 97, 98, 429/100, 96; 220/326, 346, 348, 323; 361/392; 439/627

[56] References Cited

U.S. PATENT DOCUMENTS

| 4,016,582 | 4/1977 | Wareham | 429/123 X |
| 4,230,777 | 10/1980 | Gatto | 429/97 |
| 4,607,850 | 8/1986 | O'Riley | 429/97 X |
| 4,828,944 | 5/1989 | Yabe et al. | 429/97 |
| 4,931,369 | 6/1990 | Hardt et al. | 429/123 X |

FOREIGN PATENT DOCUMENTS

| 0407966 | 1/1991 | European Pat. Off. . |
| 1-16284 | 5/1989 | Japan . |
| 2211982 | 7/1989 | United Kingdom . |

Primary Examiner—Anthony Skapars
Attorney, Agent, or Firm—Stevens, Davis, Miller & Mosher

[57] ABSTRACT

A battery holder for electronic apparatus for holding a coin-shaped battery includes a battery case which is provided with at least two protrusions, the coin-shaped battery being inserted in such a way that it is placed under these protrusions. Electrode terminals exert a resilient force so that the coin-shaped battery may be secured in position while maintaining satisfactory contact with the electrode terminals.

2 Claims, 2 Drawing Sheets

BATTERY HOLDER FOR ELECTRONIC APPARATUS

BACKGROUND OF THE INVENTION

The present invention relates to a battery holder for an electronic apparatus or the like using a coin-shaped battery or the like.

Conventionally, battery holders of electronic apparatus have been formed as sections provided inside the electronic apparatus, the battery being held by the contact pressure of terminals arranged in correspondence with the positive and negative electrodes of the battery. A part of the casing of the electronic apparatus has been formed as a battery cover, the battery being detachably secured in position by attaching this battery cover to the apparatus.

With the reduction in the size and thickness of electronic apparatuses, however, use of coin-shaped batteries has become more preferable, and the conventional battery holding structure described above has become unsuitable for electronic apparatuses using coin-shaped batteries since it requires a relatively large space. To simplify the structure of the battery holding section, the battery cover may be fixed to the casing of the electronic apparatus by means of screws. In that case, the battery cannot be easily attached to or detached from the apparatus.

SUMMARY OF THE INVENTION

The present invention has been made with a view toward solving the above problems in the prior art. It is accordingly the object of the present invention to provide a battery holder having a small battery holding section which allows the battery to be easily attached and detached.

To achieve the above object, the present invention provides a battery holder comprising a battery case, at least two protrusions provided in the battery case, and two battery contacts having resiliency, which is utilized in securing the battery in position while maintaining the requisite contact pressure.

Thus, the battery can be held in position in a small battery holding section, in such a way that it is easily attached and detached.

DETAILED DESCRIPTION OF THE PREFERRED EMBODIMENTS

Figure 1A:
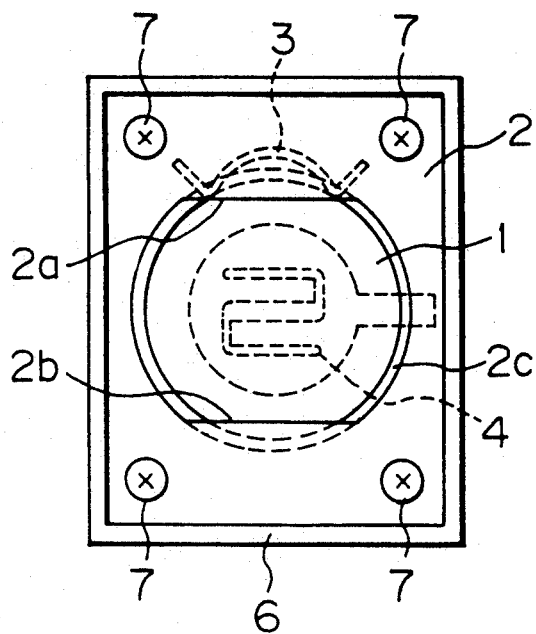
FIGS. 1a and 1b are a front and a side sectional view, respectively, of a battery holder in accordance with an embodiment of the present invention.
Figure 1B:
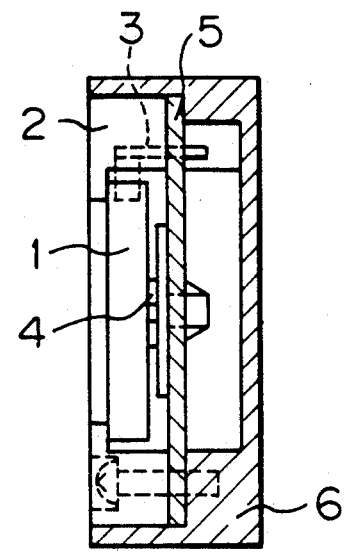

FIGS. 1a and 1b show the structure of a battery holder in accordance with an embodiment of the present invention. FIG. 1a is a front view and FIG. 1b is a side sectional view of the battery holder. In the drawings, numeral 1 indicates a coin-shaped battery; numeral 2 indicates a battery case; numerals 3 and 4 indicate battery terminals; numeral 5 indicates a printed board; numeral 6 indicates a casing; and numeral 7 indicates screws for attaching the battery case 2 to the casing 6.

In the example shown, the printed board 5 and the casing 6 are made somewhat larger than the battery case 2. Naturally, it is also possible to form the battery case 2 as a part of a larger casing. Further, even though in this embodiment, the battery case 2 is attached to the casing 6 by means of four screws 7, it is possible to fix the printed board 5 in position and integrate the battery case 2 with the casing 6 by other means. In FIG. 1, the battery cover is omitted.

Figure 2:
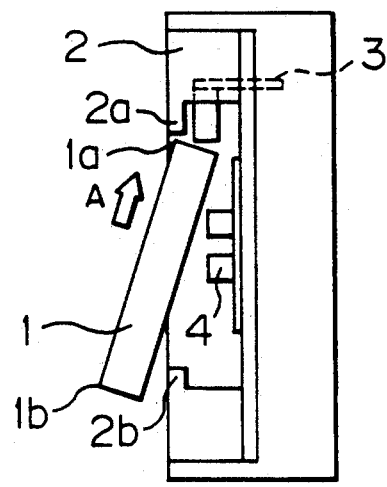
FIG. 2 is a sectional view showing how the battery is inserted into the battery case of the embodiment shown in FIG. 1.
Figure 3:
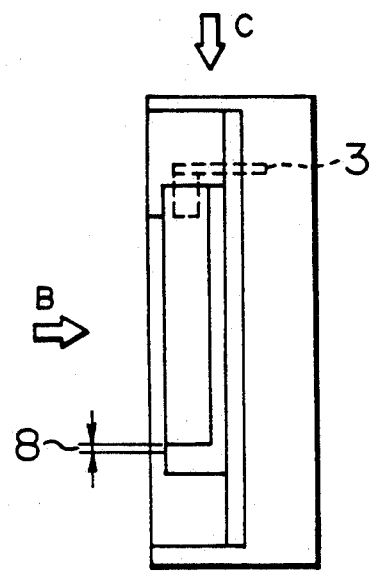
FIG. 3 is a sectional view showing the battery lodged in the battery case in the embodiment shown in FIG. 1.

FIGS. 2 and 3 show the operation of this embodiment of the present invention. In FIG. 2, the coin-shaped battery 1 is being inserted into the battery case 2. When inserting the coin-shaped battery 1 into the battery case 2, an edge portion 1a of the coin-shaped battery 1 is first put under a first protrusion 2a of the battery case 2 while the battery terminal 3 is being pressed by the coin-shaped battery 1, as indicated by arrow A. The battery terminal 4 is brought into contact with the coin-shaped battery 1 as the latter is brought into the battery case 2. Then, the battery terminal 4 exerts a resilient force which tends to raise the coin-shaped battery 1, thus exerting increased contact pressure to the battery.

In FIG. 3, the battery 1 has been fitted into the battery case. If, in this condition, the force indicated by arrow B is released, the resiliency of the battery terminal 4 causes the battery 1 to be detached from the battery case 2. However, the coin-shaped battery 1 can be completely lodged in the case, as shown in FIG. 1 when it is moved in the direction of arrow C, in the same direction in which the resilient force of the battery terminal 3 is exerted, by a distance corresponding to a clearance 8 between the battery case 2 and the coin-shaped battery 1 so as to put another edge portion 1b of the coin-shaped battery 1 under a second protrusion 2b.

The coin-shaped battery 1 can be easily detached by a reversed operation to the attaching operation described above.

Figure 4:
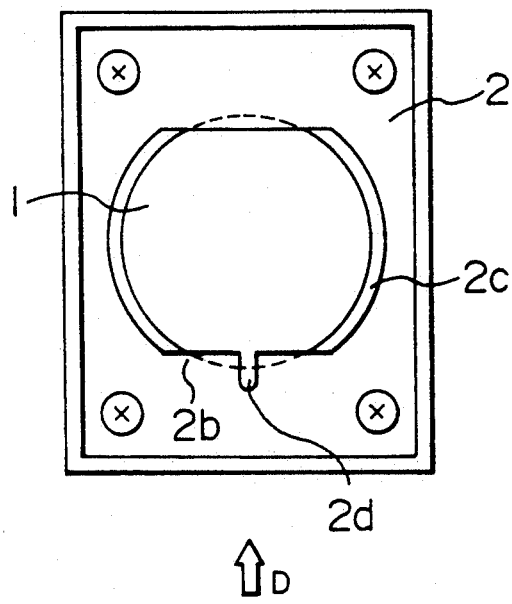
FIG. 4 is a front view showing the structure of a battery holder in accordance with another embodiment of the present invention.

FIG. 4 shows the structure of a battery holder in accordance with another embodiment of the present invention In this embodiment, a cutout 2d is provided in the battery insertion opening 2c of the battery case 2 of the embodiment shown in FIG. 1. In the example shown in FIG. 4, the cutout 2d is provided in the middle of the second protrusion 2b. By inserting a thin object or the like into the cutout 2d and pushing the coin-shaped battery 1 therewith in the direction of arrow D, the coin-shaped battery 1 can be easily detached even when the contact pressure is relatively high or the battery is held with a relatively large holding force, as is sometimes necessary.

In accordance with the present invention, as is apparent from the above two embodiments, two protrusions are provided in the battery case, and the battery is held in position by utilizing the resiliency of the two battery terminals, so that the number of parts of the battery holder need not be increased and the fixing action by the battery cover is not needed, thereby facilitating the attachment and detachment of the battery cover, and consequently, the attachment and detachment of the battery.

What is claimed is:

1. A battery holder for holding a coin-shaped battery for use in an electronic apparatus, the battery holder comprising:

a battery case having a battery insertion opening into which the coin-shaped battery is to be inserted;

at least two protrusions provided at opposing positions on edge portions of the battery insertion opening;

a first battery terminal having resiliency, located on one side of the battery insertion opening for contacting an edge of the coin-shaped battery; and a second battery terminal having resiliency, located at a bottom portion of the battery insertion opening for contacting a face of the coin-shaped battery;

at least one of the protrusions having a cutout for receiving a tool for pushing the inserted battery clear of the at least one protrusion such that the battery may be removed from the battery insertion opening;

whereby the resiliency of the first and second battery terminals holds the inserted battery in position against the protrusions and provides a requisite contact pressure between the battery terminals and the coin-shaped battery.

2. A battery holder as in claim 1, wherein the second battery terminal has sufficient resiliency that when the inserted battery is pushed clear of the at least one protrusion, the second battery terminal pushes the inserted battery out of the battery insertion opening.

* * * * *